United States Patent [19]

Asai

[11] 4,274,709

[45] Jun. 23, 1981

[54] OPTICAL FIBER FOR TRANSMISSION

[75] Inventor: Sigeru Asai, Kawagoe, Japan

[73] Assignee: Daicel Ltd., Osaka, Japan

[21] Appl. No.: 96,278

[22] Filed: Nov. 21, 1979

[30] Foreign Application Priority Data

Nov. 30, 1978 [JP] Japan ................ 53-148210

[51] Int. Cl.³ ................................ G02B 5/14
[52] U.S. Cl. ........................ 350/96.34; 350/96.30; 350/96.33; 427/163; 428/361
[58] Field of Search ............ 350/96.30, 96.31, 96.33, 350/96.34; 65/3 C; 427/162, 163, 164, 165; 428/361, 378, 392, 395

[56] References Cited

U.S. PATENT DOCUMENTS

| | | | |
|---|---|---|---|
| 3,869,194 | 3/1975 | Shiraishi et al. | 350/96.34 |
| 3,980,390 | 9/1976 | Yamamoto et al. | 350/96.33 |
| 4,072,400 | 2/1978 | Claypoole et al. | 350/96.30 |
| 4,105,284 | 8/1978 | Olshansky | 350/96.33 |
| 4,114,981 | 9/1978 | Ishida et al. | 350/96.33 |
| 4,125,644 | 11/1978 | Ketley et al. | 427/163 X |
| 4,147,407 | 4/1979 | Eichenbaum et al. | 350/96.34 |
| 4,167,305 | 9/1979 | Ichiba et al. | 350/96.34 |

FOREIGN PATENT DOCUMENTS 1524316   9/1978   United Kingdom ............... 350/96.33

Primary Examiner—John K. Corbin
Assistant Examiner—John D. Lee
Attorney, Agent, or Firm—Blanchard, Flynn, Thiel, Boutell & Tanis

[57] ABSTRACT

An optical fiber coated with a layer made of a mixture consisting essentially of from 5 to 95 percent by weight of nylon 11 or nylon 12 and, correspondingly, from 95 to 5 percent by weight of nylon copolymer.

13 Claims, 2 Drawing Figures

CHANGES OF MODULUS OF ELASTICITY IN RESPECT TO MONOMER PROPORTIONS AND TEMPERATURES

NYLON 12 / NYLON 12/6 COPOLYMER (WEIGHT RATIO)

CHANGES OF MODULUS OF ELASTICITY IN RESPECT TO MONOMER PROPORTIONS AND TEMPERATURES

MELTING HEAT WHEN THE COPOLYMER IS HEATED UP AT A RATE OF 16 °C/MIN., SAID COPOLYMER HAVING BEEN CRYSTALLIZED AT A COOLING RATE OF 16 °C/MIN. FROM THE AMORPHOUS STATE

OPTICAL FIBER FOR TRANSMISSION

CROSS-REFERENCE TO RELATED APPLICATION

This application is related to U.S. patent application Ser. No. 25,950, filed Apr. 2, 1979.

The present invention relates to an optical fiber which possesses excellent transmission characteristics and has a high mechanical strength.

In the field of manufacture of optical fiber cables for optical transmission, attempts have been made to attain a reinforcing effect by coating an optical fiber core with a plastic material or the like.

Fibers for optical communication are usually made of a low-loss quartz or an optical glass, which are brittle materials. In order to make optical fiber cables for communication, therefore, studies have been directed toward reinforcing such cables to increase their mechanical strength by covering their cores with a plastic material or the like. The optical fiber cables of this type, however, have defects, such as breakage occurring in the cores of the optical fibers and degradation of the optical transmission characteristics occurring when external pressures, impact or bending stresses are applied thereto. Therefore, polyethylene and nylon, which are crystalline thermoplastic resins having excellent mechanical and chemical properties, have been proposed as materials for covering the cores of optical fibers. At present, nylon 12 is regarded as the most suitable covering material for optical fibers (see Japanese Patent Application Laid-Open No. 17649/75 and U.S. Pat. No. 3,980,390). Even a covering material composed of nylon 12, however, is not completely satisfactory and leaves room for improvement as described below.

In the case of conventional plastic materials, however, it is difficult to form a uniform coating having a thickness of from 100 to 500μ on an optical fiber core having a diameter of less than about 200μ. Furthermore, even if a uniform coating is formed, distortion is caused during the solidification process, resulting in an increase of the optical transmission loss. Accordingly, a product which is fully satisfactory for practical use has not been obtained.

A plastic material preferred as the coating material for an optical fiber for optical transmission is required to have the following properties:

(1) In the coating step, a coating having a thickness of from 100 to 500μ can be formed at a high efficiency on an optical fiber core having a diameter of less than 200μ, which core is poor in mechanical strength;

(2) The distortion or strain in the coated product is low and hence, the optical transmission loss can be reduced;

(3) Quartz, optical glass or other material customarily used for making the optical fiber core readily undergoes oxidation degradation or chemical degradation by contact with water or the like. A certain primer is coated on the optical fiber core to prevent such degradation. At a temperature higher than 200° C., this primer is thermally decomposed, resulting in reduction of the desired properties of the optical fiber core. Accordingly, the temperature for formation of the coating should be low.

(4) In the step of gathering or laying out optical fiber cables for transmission, the cables are required to have a good softness and a good slip characteristic. Furthermore, connection of the cables to each other should be accomplished very simply and the optical transmission loss should be further reduced.

(5) The heat resistance stability in a long-time practical test for optical fiber cables (thermal degradation at 80° to 100° C. and degradation by cooling-heating cycles), the dimensional stability, the moisture absorption stability, the stability of the mechanical properties and the stability against changes, with passing of time, of the transmission loss in optical fiber cables for optical transmission should be high.

As materials for meeting the above requirements, there can be mentioned nylon 12 and a nylon copolymer. However, these materials are insufficient. For example, in the case of nylon 12, the degree of crystallization in the outer portion of the coating is different from that in the inner portion of the coating under some molding conditions, an internal strain is caused by this difference of the degree of crystallization, and the optical transmission loss is increased by this internal strain. Since the crystallinity of the nylon copolymer is low, the abovementioned molding strain is maintained at a very low level, but the elasticity is low and also the melting point is low. Accordingly, the nylon copolymer is inferior in the properties described in the above requirement (5).

Research was made with a view to obtaining a coating material that satisfies all of the requirements (1) to (5) set forth above. It was discovered that a mixture of (a) nylon 11 or nylon 12 and (b) a nylon copolymer, is very excellent as the coating material. Based on this discovery, the present invention has been completed.

BRIEF DESCRIPTION OF THE DRAWINGS

FIG. 1 is a graph showing the changes of the modulus of elasticity of the blend in respect to various temperatures and proportions of ingredients. FIG. 2 is a graph showing the changes of the melting heat of the blend in respect to proportions of the ingredients.

The present invention will now be described in detail.

Nylon 12 and a nylon 12/nylon 6 copolymer (a copolymer comprising 80 parts by weight of laurolactam and 20 parts by weight of caprolactam) are kneaded at various mixing ratios by a biaxial extruder, and the elasticity and crystallinity of the resulting mixtures are examined.

Figure 1:
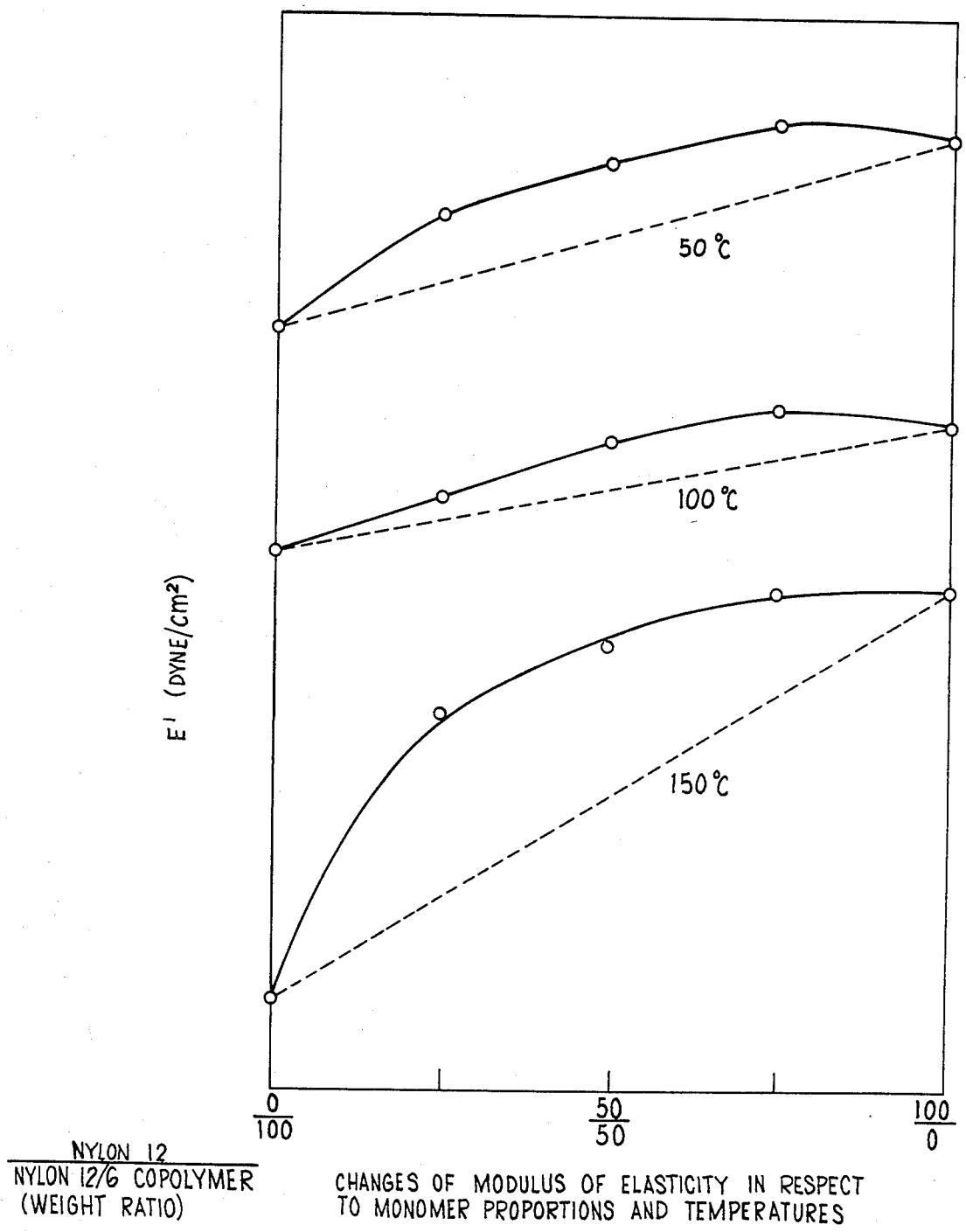
FIGS. 1 and 2 relate to a blend of nylon 12 and nylon 12/nylon 6 copolymer according to the invention.

The change of the elasticity depending on the mixing ratio of the nylon 12 and the copolymer of nylon 12 with nylon 6 is as shown in FIG. 1. The behavior is similar to that commonly observed when a plastic material having a high elasticity is mixed with a plastic material having a low elasticity. However, the change of the heat of fusion (corresponding to the degree of crystallization), as measured by DSC (scanning calorimeter), depending on the mixing ratio, is very unusual and surprising. The present invention is based on this finding.

Figure 2:
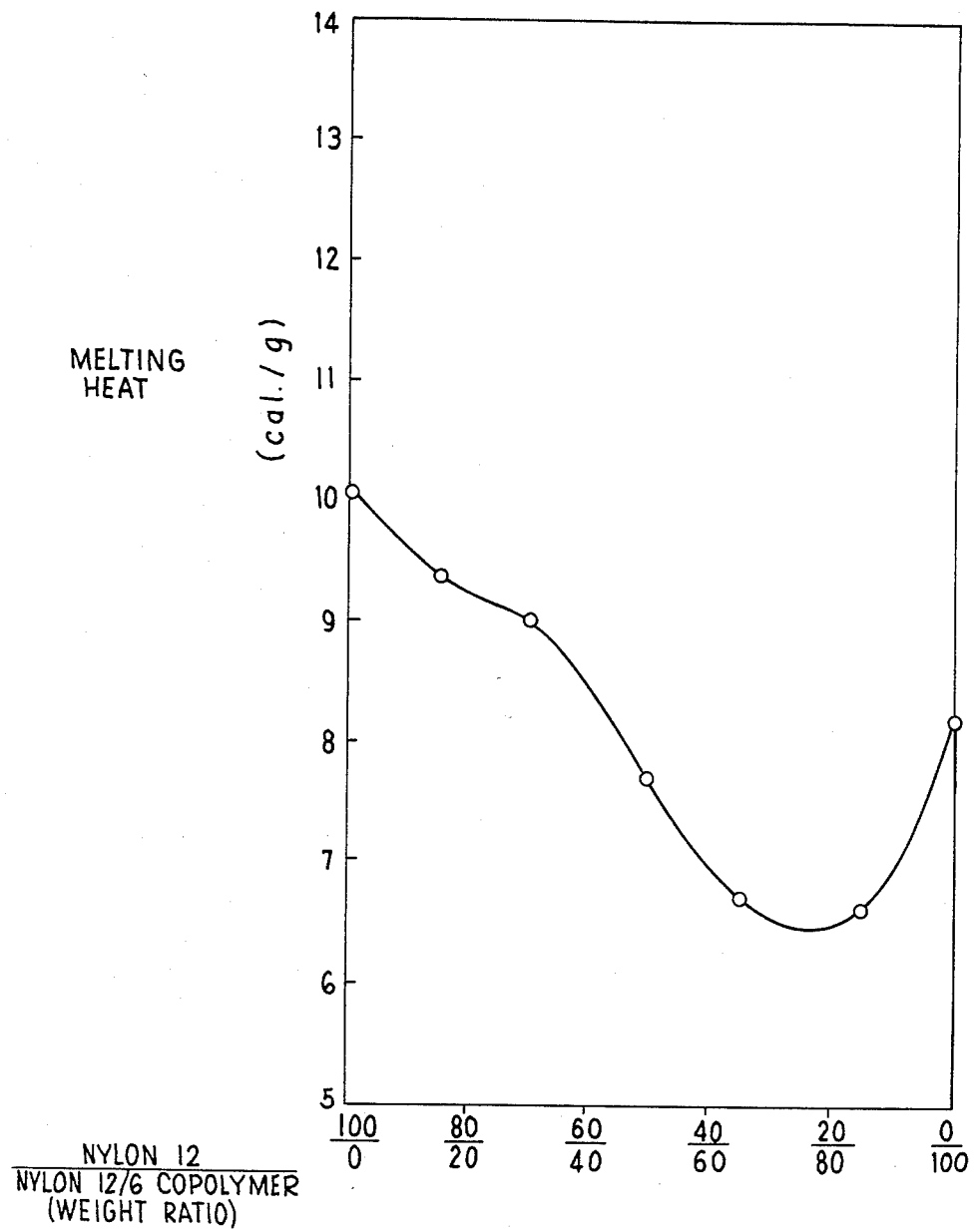

More specifically, the present invention has been completed based on the finding that, as shown in FIG. 2, when the mixing ratio of nylon 12 to the nylon 12/nylon 6 copolymer is in the range of from 40/60 to 20/80 parts by weight, the degree of crystallization, as indicated by the low value of melting heat, is remarkably low and hence, the internal strain is remarkably reduced.

Therefore, the present invention is characterized by the feature that when nylon 11 or nylon 12 is mixed with a nylon copolymer, the crystallinity can be remarkably reduced without substantial degradation of the high elasticity possessed by nylon 11 or nylon 12, with the result being that the internal strain can be remarkably reduced.

More specifically, in accordance with the present invention, there is provided an optical fiber for optical transmission in which a mixture comprising 5 to 95 parts by weight of nylon 11 or nylon 12 and correspondingly 95 to 5 parts by weight of a nylon copolymer is used as a primary and/or secondary coating material for the optical fiber core for optical transmission.

The nylon 11 or nylon 12 that is used in the present invention has a relative viscosity of 1.5 to 2.4, as measured with respect to a 0.5% solution thereof in m-cresol. Nylon 11 or nylon 12 can be copolymerized with another monomer copolymerizable with the nylon 11 or nylon 12, provided that the inherent crystallinity of nylon 11 or nylon 12 is not substantially affected. In this case, the content of nylon 11 or nylon 12 should be higher than 90 wt. %.

As the nylon copolymer, there can be used any of the semicrystalline and amorphous nylon copolymers, provided that it is compatible with nylon 11 or nylon 12.

Nylon monomers to form the nylon copolymer used in the invention include lactams having 4 to 16 carbon atoms, ω-amino-carboxylic acids having 4 to 16 carbon atoms and salts of alkylene diamines having 4 to 16 carbon atoms and alkylene dicarboxylic acids having 4 to 16 carbon atoms. Preferred monomers are caprolactam, capryl lactam and laurolactam as the lactam; ω-aminopelargonic acid and ω-amino-undecanoic acid as the ω-amino-carboxylic acid; and hexamethylene diamine sebacate, hexamethylene diamine adipate, hexamethylene diamine dodecane-dicarboxylate, and hexamethylene diamine tridecane-dicarboxylate as the salt. As to other salts, there can be also used salts of sebacic acid, adipic acid, dodecane dicarboxylic acid or tridecane dicarboxylic acid with decamethylene diamine, tridecanediamine or 2,2,4- or 2,4,4-trimethyl hexadiamine.

The nylon copolymer is prepared by conventional polymerization of two or more kinds of monomers.

The most preferable nylon copolymer contains ω-amino-undecanoic acid or laurolactam as one monomer.

It is further preferred that the nylon copolymer has a melting point of from 90° C. to 170° C. The melting point is measured as being the temperature where the maximum absorption of heat appears when the nylon copolymer is heated at a rate of 16° C./min., as measured by a differential scanning calorimeter.

In this preferred nylon copolymer, it is preferred that the content of ω-amino-undecanoic acid or laurolactam in the nylon copolymer is from 20 to 90 wt. %, preferably from 30 to 80 wt. %.

The mixing ratio between (1) nylon 11 or nylon 12 and (2) the nylon copolymer, should be determined depending on the atmosphere and the field in which the optical transmission fiber is to be used. Ordinarily, the mixing ratio of nylon 11 or nylon 12 to the copolymer nylon is in the range of from 95/5 to 5/95, preferably about 10/90 to 80/20.

In producing the fiber for optical communications according to the present invention, the covering layer of the blend of nylon 11 or 12 and in the nylon copolymer can be formed on the core of the optical fiber by any known method of forming the covering layer. The most suitable method, however, is to melt the resin composition and to cover the core of the optical fiber by extruding the resin composition onto the core. Namely, the resin composition is melted by means of a screw extruder and is coated on the core by way of a drawing method (inclusive of vacuum lining method), or the resin composition is melted by any suitable method and is extruded by means of a gear pump to apply it to the core.

The thus obtained coated fiber for optical communications is then covered on its outer surface with a protective layer whereby to make an optical fiber cable. Such a cable can be manufactured in the same manner as the conventional optical fiber cables. A plurality of the coated optical fibers may be formed into one cable by enveloping same with a sheath of a thermoplastic resin.

As described above, the fiber for optical communications according to the invention has a special coating layer on the surface. A plurality of such optical fibers coated with the nylon blend according to the invention is bundled and the bundle is coated with a thermoplastic resin. Practical embodiments of the invention can include an optical fiber having thereon at least one coating layer of the nylon blend according to the invention and at least one coating layer of another resin such as those listed below. It is furthermore added that the coating layer is preferred to be either a single or a double layer. In the case of the double layer, the outer layer is composed of the nylon blend according to the invention and the inner layer can be composed of a resin different from that of the outer layer. The resin used as a basic ingredient of the resin composition used herein to make the other layer can be of any suitable type such as thermoplastic resins, thermosetting resins and the like and, from the viewpoint of the adhesion to the glass fiber, suitable resins for the other layer include, for example, polyethylene, vinyl resins such as polyvinyl chloride, polyester, polyamide, polyacetal, polyvinylacetal, polysulfone, polyurethane, polyether, polyesterimide, polyamideimide, polyimide, polyacrylate, polyvinylacetate, ethylenevinylacetate copolymer, ethyleneacrylic acid copolymer, epoxy resin, phenol resin, resorcinol resin, unsaturated polyester resin, urea resin, furan resin, silicone resin, alkyd resin, melamine resin, diallylphthalate resin, etc. or derivatives thereof.

One of the practical embodiments of the invention is a fiber having two superposed coating layers composed of silicone resin and the nylon blend according to the invention, from the inside to the outside.

The low-loss optical fiber core to be used in the invention can include any of the conventional ones, such as those of the glass-clad type, the self-focusing type and the single material type.

The present invention will now be further described with reference to the following illustrative Examples.

EXAMPLE 1

A mixture comprising 30 parts by weight of nylon 12 and 70 parts by weight of a nylon 12/nylon 6 copolymer (80/20), having a melting point of 155° C., was kneaded by a biaxial extruder and was extrusion-coated as a layer having a thickness of 300μ on a clad-type optical fiber core of quartz glass having a diameter of 200μ from a drawdown die, by using an extruding machine for nylon having a screw diameter of 40 mm. An optical transmission fiber was prepared by using the thus-coated optical fiber. The resulting optical transmission fiber was very flexible and the thickness deviation of the coating having a thickness of 300μ was within ±30μ, and the dimensional stability was very good.

The optical transmission loss of the thus-obtained optical fiber was measured after 24 hours had passed from the preparation thereof. It was found that the optical transmission loss was 5 dB/Km. This value was quite the same as the value of the transmission loss of the optical fiber core and the transmission loss was not increased at all by the abovementioned plastic coating. Thus, it was confirmed that the mixture used in this Example is a very excellent coating material. Furthermore, since the elasticity of the mixture was higher than the elasticity of the nylon 12/nylon 6 copolymer, the terminal treatment could be accomplished very easily.

EXAMPLE 2

An optical fiber for optical transmission was prepared by coating a mixture of 70 parts by weight of a nylon 12/nylon 6 copolymer (laurolactam/caprolactam=95/5) and 30 parts by weight of a nylon 12/nylon 6 copolymer (80/20) was coated on an optical fiber core having a diameter of 150μ and which was coated with a silicone rubber coating of 100μ in thickness, according to the same procedures as described in Example 1. The transmission loss of the thus-obtained optical transmission fiber was measured after 24 hours had passed from the preparation thereof. It was found that the transmission loss was 6 dB/Km and the increase of the transmission loss due to formation of the nylon mixture coating was only 1 dB/kM. The optical transmission fiber was very excellent in the abrasion resistance and mechanical characteristics such as the bending property.

EXAMPLE 3

An optical fiber for optical transmission was prepared by coating a mixture of 50 parts by weight of nylon 11 and 50 parts by weight of a nylon 6/nylon 6,6/nylon 12 copolymer (caprolactam/hexamethylene adipate/laurolactam=30/30/40), having a melting point of 106° C., on an optical fiber core having a diameter of 200μ, according to the same procedure as described in Example 1. The transmission loss of the thus-formed optical transmission fiber was measured after 24 hours had passed from the preparation thereof. It was found that the transmission loss was 8 dB/Km and the increase of the transmission loss owing to the coating of the nylon mixture was only 3 dB/Km.

The embodiments of the invention in which an exclusive property or privilege is claimed are defined as follows:

1. An optical fiber for optical transmission comprising an optical fiber core for optical transmission, said core being covered with a coating layer consisting essentially of a mixture of (1) from 5 to 95 percent by weight of nylon 11 or nylon 12 and, correspondingly, (2) from 95 to 5 percent by weight of nylon copolymer of two or more different nylon-forming monomers selected from the group consisting of (a) lactams having 4 to 16 carbon atoms, (b) ω-amino carboxylic acids having 4 to 16 carbon atoms and (c) salts of alkylene diamines having 4 to 16 carbon atoms and alkylene dicarboxylic acids having 4 to 16 carbon atoms.

2. An optical fiber as claimed in claim 1 in which said mixture contains from about 10 to about 80 percent by weight of nylon 11 or nylon 12 and correspondingly from about 90 to about 20 percent by weight of said nylon copolymer.

3. An optical fiber as claimed in claim 1 in which said core has a diameter of about 200 microns or less, and the thickness of said layer is from about 100 to 500 microns.

4. An optical fiber as claimed in claim 1 in which said nylon copolymer is amorphous or semicrystalline and is compatible with said nylon 11 or nylon 12.

5. An optical fiber as claimed in claim 4 in which said nylon copolymer has a melting point of from about 90° to about 170° C.

6. An optical fiber as claimed in claim 1, in which said mixture consists essentially of from 40 to 20 percent by weight of nylon 12 and, correspondingly, from 60 to 80 percent by weight of nylon 12/nylon 6 copolymer containing from 30 to 80 percent by weight of nylon 12.

7. An optical fiber as claimed in claim 1 in which said nylon copolymer contains from 20 to 90 percent by weight of ω-amino undecanoic acid or laurolactam.

8. An optical fiber as claimed in claim 1 in which said nylon copolymer contains from 30 to 80 percent by weight of ω-amino undecanoic acid or laurolactam.

9. An optical fiber as claimed in claim 1 which is also coated with one or more additional layers of a thermoplastic or thermosetting resin different from said mixture.

10. An optical fiber as claimed in claim 9 in which said additional layer is an inner layer and said layer of said mixture is an outer layer on said core.

11. An optical fiber as claimed in claim 10 in which said core is coated with an inner layer of silicone resin and said coating of said mixture is an outer layer coated on said inner layer.

12. An optical fiber as claimed in claim 1 in which said nylon 11 or nylon 12 has a relative viscosity in the range of from 1.5 to 2.4.

13. An optical fiber for optical transmission comprising an optical fiber core for optical transmission, said core being covered with a coating layer consisting essentially of a mixture of (1) from 10 to 80 percent by weight of nylon polymer containing more than 90 percent by weight of nylon 11 or nylon 12 and, correspondingly, (2) from 90 to 20 percent by weight of nylon copolymer of two or more different nylon-forming monomers selected from the group consisting of (a) lactams having 4 to 16 carbon atoms, (b) ω-amino carboxylic acids having 4 to 16 carbon atoms and (c) salts of alkylene diamines having 4 to 16 carbon atoms and alkylene dicarboxylic acids having 4 to 16 carbon atoms, said nylon copolymer containing from 30 to 80 percent by weight of ω-amino undecanoic acid or laurolactam, and the balance being one or more of said monomers different from ω-amino undecanoic acid or laurolactam, said nylon copolymer having a melting point of from 90° to 170° C.

* * * * *